Dec. 9, 1947.  E. A. STALKER  2,432,348
AIRCRAFT
Filed Oct. 18, 1943  2 Sheets-Sheet 1
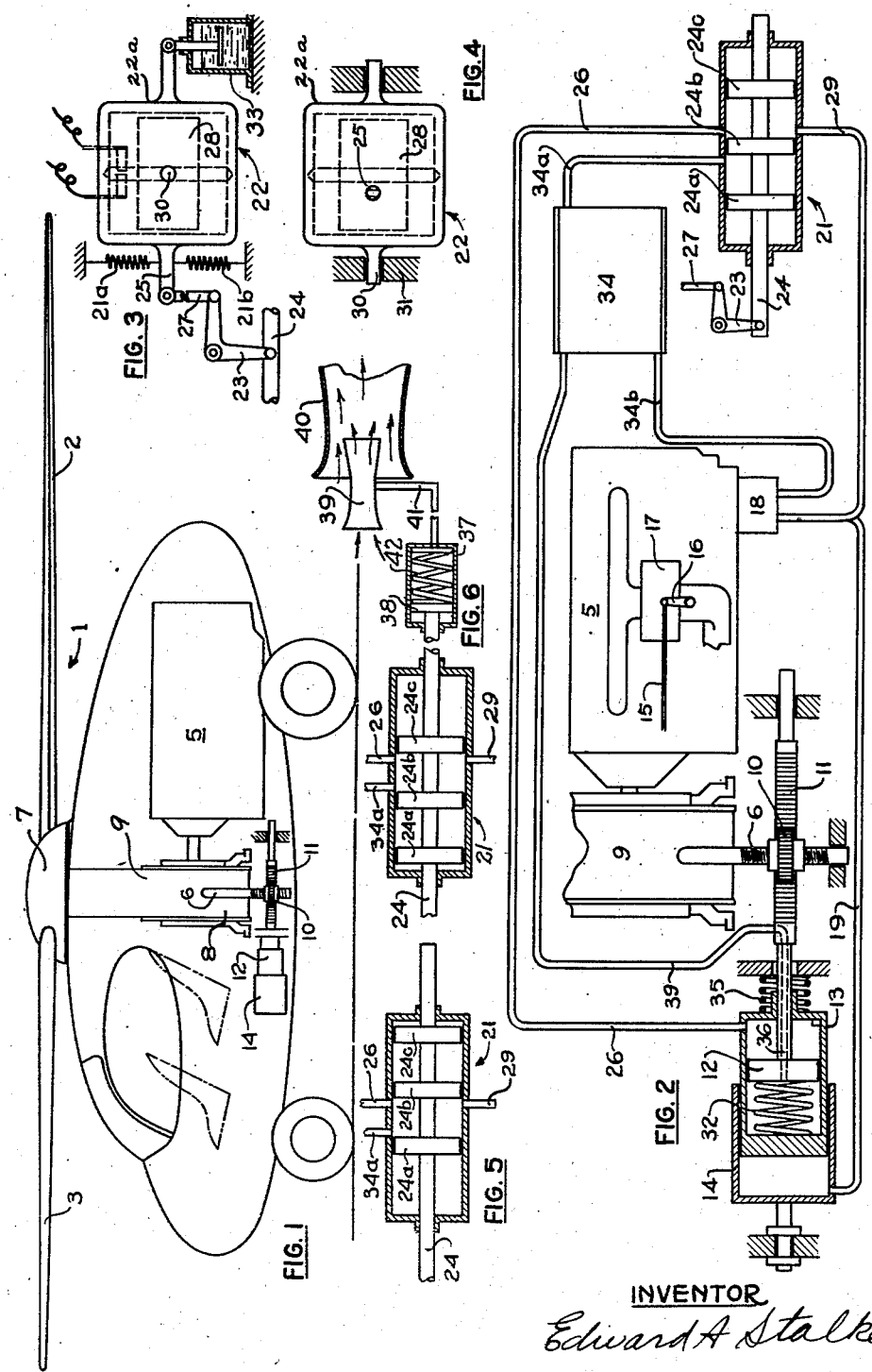

Dec. 9, 1947.  E. A. STALKER  2,432,348
AIRCRAFT
Filed Oct. 18, 1943  2 Sheets-Sheet 2
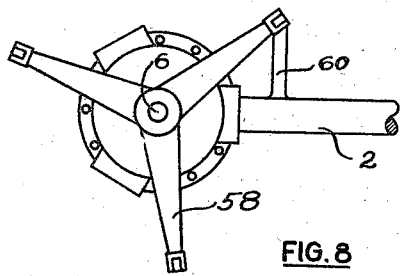
FIG. 8
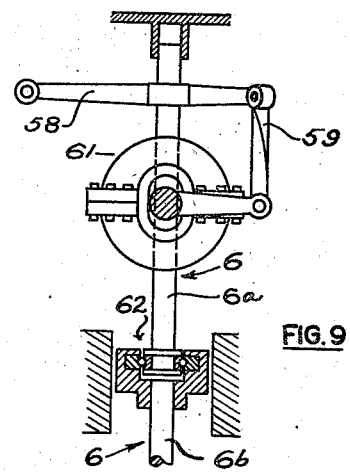
FIG. 9
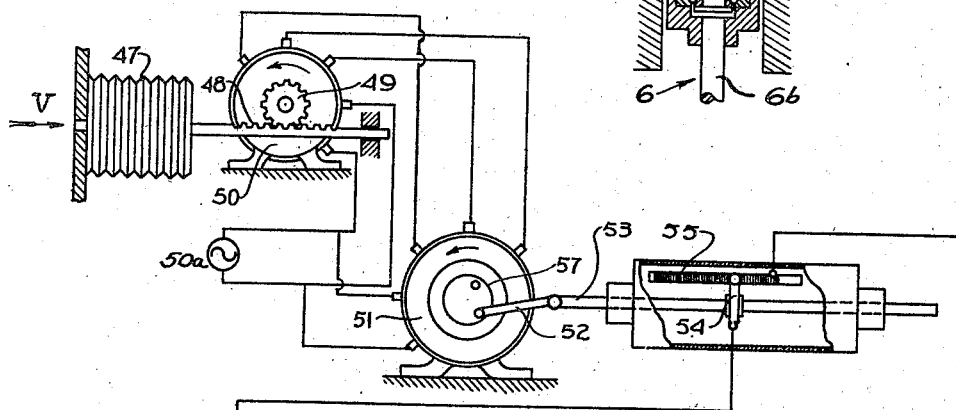
FIG. 7
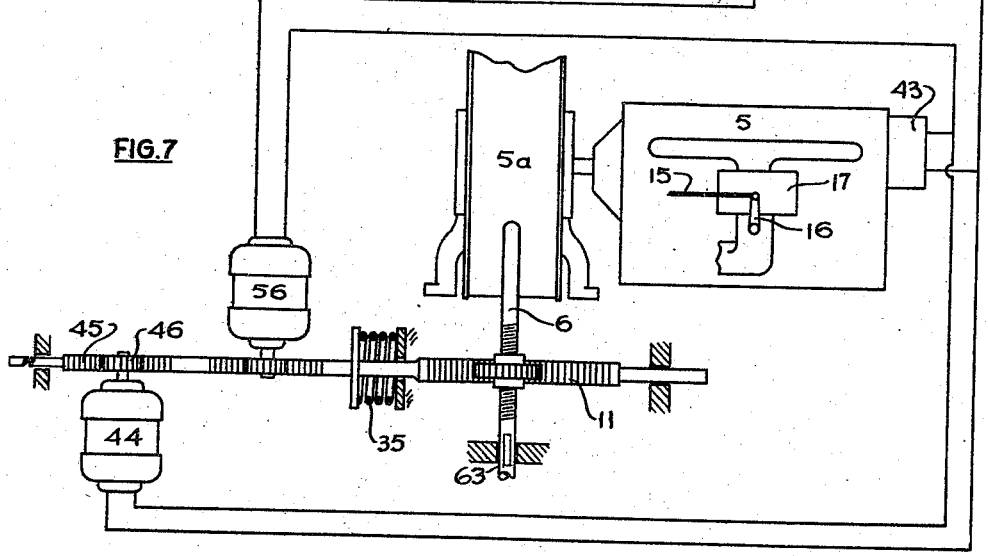
INVENTOR
Edward A. Stalker
By Marechal & Biebel
ATTORNEYS Patented Dec. 9, 1947

2,432,348

UNITED STATES PATENT OFFICE 2,432,348

AIRCRAFT

Edward A. Stalker, Bay City, Mich.

Application October 18, 1943, Serial No. 506,658

12 Claims. (Cl. 244—17)

This invention relates to helicopters and particularly to means of control for the lifting rotor. It has for its principal object to provide a control to adjust automatically the lift coefficient of the rotor wings for either horizontal flight or descent if the motor fails.

It is also an object to provide such a control for a helicopter in which the pitch of the rotor blades is increased for hovering or ascending flight and properly reduced for forward flight.

It is a further object to provide such a control in which the pitch of the blades is reduced to provide for forward flight, and further reduced to provide for vertical descent.

Other objects will appear from the description and drawings.

In the drawings:

Fig. 1 is a side elevation of the aircraft with certain interior mechanism also shown in elevation;

Fig. 2 is a view partially in section and partially schematic showing the devices to adjust the rotor lift;

Fig. 3 is an elevation of the gyroscope and its associated mechanism;

Fig. 4 is a side elevation of the gyroscope at right angles to Fig. 3;

Fig. 5 is a detail sectional view of the regulating valve for a certain position of the plungers;

Fig. 6 shows a modified control arrangement responsive to the forward speed of the aircraft;

Fig. 7 shows another form of the invention employing electrical control means;

Fig. 8 is a fragmentary top plan view of part of the pitch changing mechanism; and Fig. 9 is a fragmentary view partially in side elevation and partially in vertical section of part of the pitch changing mechanism.

When a helicopter is hovering or ascending vertically, there is a large inflow into the rotor disk requiring large pitch angles for the blades. These are so large that the rotor would not be capable of autorotation if the engine failed and the aircraft started to descend. Hence, there is a need to reduce the blade pitch when descent begins.

Furthermore, following the condition of hovering, when the aircraft is directed horizontally, the pitch should be decreased to avoid a tendency for the machine to begin climbing, which it will do for a given pitch setting when it moves out of the downflow induced while it is hovering.

It is thus desirable that following the hovering condition the pitch of the rotor blades or the lift coefficient of the rotor blades should be automatically adjusted to assume the proper values for either horizontal translation or vertical descent following the hovering condition. While this necessitates a decrease in pitch in both cases, there is, however, a distinction to be made between the two conditions discussed.

While climbing, the full power of the motor is needed to rotate the rotor with the blades set at a high pitch. If the engine fails to produce power, the aircraft passes through the hovering attitude to the condition of descent when the pitch must be low enough for autorotation, if the aircraft is to be sustained properly. If the passage is from the hovering state to maximum forward speed, full power is again required with a reduction in pitch below that of the hovering state, but preferably not to as low a pitch as that desired for the autorotation state. The power is consumed under these conditions in an increased rate of rotation of the rotor.

In accordance with this invention, mechanism is provided which properly responds to and automatically adjusts the pitch of the blades to a suitable value for either of these conditions following hovering or vertical flight.

Referring to the drawing which illustrates a preferred embodiment of the invention, the rotor is 1 composed of the blades 2, 3 and 4 supported on the hub 7 for rotation therewith about a vertical axis. The rotor is conveniently driven, such as by jets from the blades as described in my U. S. Patent No. 2,084,464. Briefly the motor 5 rotates the blower 8 which delivers air to the interior of the hub 7 by duct 9. From the hub the air enters the blades and is discharged from the blades thereby providing a thrust to rotate them.

The blades are rotatable in the hub 7 about their spanwise axes to change their pitch angles. The change in the pitch angles is accomplished by the vertical movement of shaft 6 in a manner to be described subsequently.

The blower 8 as shown is preferably a centrifugal blower with its discharge duct 9 in the center of the fuselage. The blower itself is offset from the center of the fuselage because of the shape of the volute collector of the blower. The shaft 6 enters the duct 9 on the curved lower portion and extends inside to the hub 7.

The general scheme of the invention is to provide for varying the pitch in one direction to effect pitch increase for the condition of climb, and to vary the pitch in the opposite direction for forward flight and for autorotation. Control means is also provided to establish an intermediate pitch as for the interval of time during which the aircraft changes from vertical flight to horizontal flight. Then as the aircraft reaches substantially steady horizontal flight the control means is made inoperative so that the pitch of the rotor can be again increased even to the maximum value.

Referring to Fig. 2, an engine driven pump 18 supplies fluid pressure through conduit 19 to a cylinder 14 containing piston 13. In response to fluid pressure supplied by the pump, the piston overcomes the opposing effect of spring 35 and moves toward the right. This carries the internal piston 12 also toward the right and through the piston rod connection 36 effects actuation of rack 11 and pinion 10. The pinion is held against vertical travel and thus an axial movement is imparted to the pitch adjusting shaft 6, this movement being in the direction to cause an increase in the blade pitch. Upon release of such fluid pressure, spring 35 produces an opposite movement of the piston 13 and rack 11, resulting in a decrease in the blade pitch. The piston 12 constitutes a means under the influence of fluid pressure for opposing the action of cylinder 14 and thereby establishing an intermediate pitch value suitable for the transition from vertical flight to horizontal flight.

If the helicopter is resting on the ground the engine throttle is moved to the open position moving rod 15 and valve arm 16 which admits a full fuel charge to the engine 5 through the carburetor 17. As the engine gains speed pump 18 delivers via tube 19 an increasing pressure to cylinder 14 forcing the cylinder 13 rearward to provide a condition of high blade pitch. The fluid pressure is also delivered to valve 21 via tube 29. The valve 21 has its pistons 24a, 24b, 24c in the position shown in Fig. 5 so that the fluid pressure readily escapes to the reservoir 34 via the tube 34a and no significant pressure reaches piston 12 through line 26.

When the airplane reaches a suitable height to begin horizontal flight the pilot tilts the fuselage and rotor through the use of any desired type of control mechanism so as to incline the axis of rotation forward which gives a forward component of the rotor thrust. A gyroscope 22 having a frame 22a is mounted in the fuselage on trunnions 30 with the axis of its trunnions along the longitudinal axis of the fuselage. The gyroscopic rotor 28 is spun by electrical means in the frame 22a and may in fact constitute the armature of a high-speed motor.

As a consequence of the change of motion of the aircraft. i. e., the tilting of the fuselage, the gyroscope 22 is tilted since it is aligned in the fuselage, and the axis of the gyroscopic rotor is made to precess about the trunnion axis. This precession moves the arm 25 against the restraining action of neutralizing springs 21a and 21b and is transmitted through link 27, and bell crank 23 to shift the valve 21 into the position shown in Fig. 2.

With the position of valve 21 as shown, fluid pressure from pump 18 is supplied through conduit 26 to the righthand side of piston 12. This causes the movement of rack 11 toward the left against the action of spring 32 from the maximum rearward position initially established by the cylinder 14 and thus reduces the pitch below the maximum. Hence as the helicopter moves forward out of its own downflow the pitch of the blades is decreased.

As the fuselage ceases to tilt, the gyroscope ceases to precess and is gradually restored to its neutral position by the centering springs 21a and 21b. A damper 33 insures a gradual return under the action of the springs. This return to neutral restores valve 21 to the position shown in Fig. 5 which again makes the pitch a maximum which is useful in attaining maximum speed forward.

If the airplane is hovering and the engine ceases to deliver power, the pressure in tube 19 disappears and the spring 35 decreases the pitch of the blades to that of the autorotation state. The piston 12 is then against the righthand end of cylinder 13, being pushed there by the spring 32. There is, of course, no fluid pressure from tube 26. Fluid pushed out of the space to the left of piston 12 and about the spring 32 flows through a passage in piston 12 and the hollow piston rod 36, through conduit 39 back to the reservoir 34. Thus if the airplane is advancing horizontally and the engine fails to deliver power, the blades are moved to the autorotation state just as for the hovering case.

It is desirable that the pitch (or lift coefficient) can be increased as the forward speed increases. Hence, the gradual elimination of the gyroscopic action, as the aircraft ceases to rotate, is an important feature of the invention. It is only in the transition stage from vertical flight (or hovering) to horizontal flight that the pitch should at first decline. As forward speed is gained, it should become possible to increase the pitch by opening the throttle thus developing a greater fluid pump pressure and causing a further pitch increase. The springs 21a and 21b return the gyroscope to neutral when the precessional force disappears, as it does when the gyroscope ceases to be tilted.

If the aircraft is flying horizontally and is pitched up at the nose, the gyroscope precesses in reverse and increases the pitch of the blades. In machines for certain services, this will be undesirable and a stop can be readily provided to prevent the precession of the gyroscope in the direction to increase the blade pitch.

If the aircraft is flying horizontally and is dived, the gyroscope will precess so as to decrease the pitch of the blades in the same manner as changing from hovering to horizontal flight.

It is not necessary that the airplane body be tilted in order to affect the gyroscope. The control stick may be connected to the gyroscope to tilt it at the same time that the blades are feathered to imitate the advance and thus bring about the desired change of pitch conditions.

Fig. 6 is a partial view of a modified control for valve 21 in response to the forward speed of the aircraft. In this form, a venturi 39 subject to the forward relative wind has its exit at the throat of venturi 40 to compound the throat suction which is transmitted through tube 41 to the cylinder 37 to act on piston 38 on valve shaft 24 moving it to the right in opposition to spring 42. The fluid connections to valve 21 are as described above.

At the time of take-off. valve 21 is in the position shown in Fig. 6 and fluid pressure is directed to cylinder 14 only so that a high pitch condition prevails. no pressure being transmitted through conduit 26 because of the opening through conduit 34a. As the aircraft moves forward the wind creates a suction in venturi 39 which moves the piston 38 to the right against spring 42. This puts valve 21 in the position shown in Fig. 2 permitting pressure to reach piston 12, reducing the pitch to an intermediate value suitable for the transition from vertical to horizontal flight. As the forward speed continues to increase, the valve moves still farther into the position shown in Fig. 5 which again directs fluid only to cylinder 14 and provides for maximum pitch for maximum forward speed.

A further form of the invention is shown in Fig. 7 employing electric power. Motor 44 derives electric power from the generator 43 driven by the engine 5. Operation of this motor alone forces the rack 11 fully to the right against the action of spring 35 and sets the blades at maximum pitch. The spring 35 in the absence of torque from 44 forces the rack fully to the left and gives minimum pitch for the autorotative state. A second motor 56 is also connected to the rack 11 and acts in opposition to motor 44 to provide an intermediate pitch setting for the transition to horizontal flight. Motor 56 is energized from generator 43 and the power which it develops is regulated by suitable means such as resistor 55.

The mechanism to control the motors is made dependent on the wind pressure by means of bellows 47. If there is no forward speed the velocity V is zero and the motor 44 receives relatively large power from the generator 43. Thus the rack 11 is pushed fully to the right setting the blade pitch at a maximum for climb. As the machine takes on forward speed the pressure in the bellows 47 is increased so that the rack 48 is moved to the right turning the pinion 49 of positioning motor 50 which is supplied with current from an alternating generator 50a. This positions the armature of positioner motor 50 according to the forward speed. Suitable connections are made between the transmitting motor 50 and a receiving motor 51 for causing the latter to assume a corresponding angular position of its armature. The connecting rod 52 is pivoted to the armature and to the push rod 53 which carries the contact 54 running on the resistor 55. This resistor is connected at one end to the generator 43 and the contact is connected to the motor 56 which also has a lead to the generator.

As the positioner motor 50 is rotated, the receiving or following motor 51 pushes the contact toward the end of the resistor so that more power flows to motor 56. The torque of this motor with the help of spring 35 pushes the rack 11 to the left overcoming the torque of motor 44 and thereby reducing the pitch of the blades. The pitch of the blades now corresponds to the transition regime from vertical to horizontal flight.

As the relative wind increases the contact 54 is reversed in direction of travel because the crankpin 57 passes its horizontal dead center position and approaches its top center position. Thus the pitch of the blades is first decreased in going from the vertical climb or hovering state to that of horizontal flight and then the pitch is increased to facilitate a high horizontal speed of flight.

When there is no forward speed the elasticity of the bellows returns the contact 54 to the forward end of the resistor 55 so that there is a large resistance in the circuit to motor 56 which makes motor 44 predominant in torque.

If the engine or generator fails at any time, the electric power disappears whereupon the spring 35 is free to position the rack 11 at low pitch position to provide autorotative angles for the blades of the rotor 1.

In the discussion of the invention the throttle is assumed either closed or fully open. The throttle however may have any intermediate position and will simply cause a different pitch setting always tending to the autorotative pitch as the throttle is progressively closed. For instance in Fig. 7 the difference between the opposing torques of motors 44 and 56 opposes the action of spring 35. As the throttle is partially closed the power from generator 43 reaching the motors is decreased so that spring 35 is able to move the rack further to the left. Finally when the engine 5 is stopped the spring 35 is in complete command and moves the rack for the full travel to establish minimum pitch conditions.

Figs. 8 and 9 show how a vertical movement of shaft 6 changes the pitch angle of the blades. At the upper end of shaft 6 is fixed the spider 58. Each of its arms is connected by a link 59 to an arm 60 of the blades. It will be clear that a vertical movement of the spider will rotate a blade about its spanwise axis.

The shaft 6 can be slid vertically through the ball 61 which is preferably constructed as described more in detail in said Patent No. 2,084,464. The shaft 6 necessarily rotates with the hub and to accommodate this motion the bearing joint 62 permits part 6a to rotate relative to part 6b while transmitting axial thrust therebetween. The lower part is fixed from turning by a keyway 63 in the lower end of the shaft.

While the forms of apparatus herein described constitute a preferred embodiment of the invention, it is to be understood that the invention is not limited to these precise forms of apparatus, and that changes may be made therein without departing from the scope of the invention which is defined in the appended claims.

What is claimed is:

1. In combination in an aircraft, a wing mounted for rotation about an upright axis, means to rotate said wing, means to vary the lift of the wing, a device responsive to change in the motion of the aircraft transverse to said upright axis, means operatively connecting said device to said lift varying means to decrease automatically the lift of said wing in accordance with said change of motion of the aircraft for a predetermined range of increasing velocities and to increase the lift of said wing for another range of increasing velocities.

2. In combination in an aircraft, a wing mounted for rotation about an upright axis, an engine to rotate said wing, pitch changing means to vary the pitch angle of the wing, a device responsive to change in the motion of the aircraft transverse to said upright axis, means operatively connecting said device to said pitch changing means to decrease automatically the pitch of said wing in accordance with said change of motion of the aircraft for a predetermined range of increasing velocities and to increase the pitch of said wing for another range of increasing velocities, and means to decrease the pitch of said wing to the autorotative state automatically in accordance with the decrease of the engine power below a predetermined value.

3. In combination in an aircraft, a wing mounted for rotation about an upright axis, an engine to rotate said wing, lift varying means to vary the lift of the wing, a device sensitive to a change in the forward motion of the aircraft, and means operatively connecting said device to said lift varying means to decrease automatically the lift coefficient of said wing in accordance with said change of motion of the aircraft for a predetermined range of increasing velocities and to increase the lift coefficient of said wing for a higher range of velocities, and means to decrease the lift coefficient of said wing to the autorotative value automatically in accordance with the decrease of the engine power below a predetermined value.

4. In combination in an aircraft, a wing mounted for rotation about an upright axis, means for varying the pitch of said wing, a device responsive to the forward relative velocity of the aircraft, electrical means responsive to said device to decrease the pitch of the wing for a range of increasing velocities and to increase the pitch for a succeeding range of increasing velocities.

5. In combination in an aircraft, a wing mounted for rotation about an upright axis, means for varying the pitch of said wing, a first electrical means for increasing the pitch of the wing, a second electrical means for decreasing the pitch of the wing, a device responsive to a change in the motion of the aircraft transverse to said upright axis, and means including said device and operably connected to said two means to govern automatically the degree of their effective relative operations in accordance with said motion of the aircraft.

6. In combination in an aircraft, a wing mounted for rotation about an upright axis, means for varying the pitch of said wing, an engine to rotate said wing about said upright axis, a first electrical means for increasing the pitch of the wing, a second electrical means for decreasing the pitch of the wing, a device responsive to a change in the motion of the aircraft transverse to said upright axis, means including said device and operably connected to said two means to govern automatically the degree of their effective relative operations in accordance with said motion of the aircraft, and means to adjust the pitch of the wings to the autorotative state automatically as a function of the operation of said engine.

7. In combination in an aircraft, an engine, a wing mounted for rotation about an upright axis by said engine, means for also mounting said wing for rotation about a spanwise axis to alter its pitch, means to increase the pitch of said wing in response to a function of the engine's operation, additional means to decrease the pitch of the wing, means responsive to forward motion of the aircraft, means controlled by said responsive means and operable during normal engine operation to proportion the relative pitch changes between said pitch increasing means and said pitch decreasing means.

8. In combination in an aircraft having a wing, means for adjusting the angle of attack of said wing, a device responsive to wind speed, a positioner electric motor having a source of power, a follower electric motor operably connected to said positioner motor to be positioned in corresponding angular relation therewith, a driven electric power motor having a source of power, means interconnecting said device and said positioner motor to position its armature as a function of the wind speed, and means controlled by said follower motor to regulate the torque output of said driven motor alternately below and above a mean value for a range of increasing wind speeds, and means to apply said torques to vary the angle of attack of said wing from a relatively high value to a lower value and subsequently to a relatively high value over a progressively increasing range of wind speeds.

9. In combination in an aircraft of the direct lift type, a wing rotatable about an upright axis, means to vary the pitch of said wing, a device responsive to the flight speed of the aircraft, means controlled by said speed responsive device for operating said pitch varying means to decrease the pitch of said wing for a range of increasing velocities of the aircraft, and means also controlled by said speed responsive device for operating said pitch varying means to increase the pitch of said wing for a succeeding range of increasing velocities.

10. In combination in an aircraft, a wing mounted for rotation about an upright axis, adjustable means to vary the lift of said wing independently of the orbital position thereof, means responsive to the speed of flight of the aircraft, means controlled by said speed responsive means for operating said lift adjusting means to decrease the lift of said wing for a range of increasing velocities of the aircraft, and means also controlled by said speed responsive means for operating said lift adjusting means to increase the lift of said wing for a succeeding range of increasing velocities.

11. A combination as defined in claim 1 in which said device responsive to change in the motion of the aircraft transverse to the upright axis embodies an inertia element sensitive to such change in motion.

12. In combination in an aircraft of the direct lift type, a wing rotatable about an upright axis, means to vary the lift of said wing, means responsive to a change in the angle between said upright axis and a horizontal plane, means controlled by said responsive means for operating said lift varying means to decrease the lift of said wing for a range of increasing velocities of the aircraft, and additional means also controlled by said responsive means for operating said lift varying means to increase the lift of said wing for a succeeding range of increasing velocities.

EDWARD A. STALKER.

REFERENCES CITED

The following references are of record in the file of this patent:

UNITED STATES PATENTS

| Number | Name | Date |
|---|---|---|
| 2,209,879 | Focke | July 30, 1940 |
| 2,325,632 | Pullin | Aug. 3, 1943 |
| 2,023,105 | Smith | Dec. 3, 1935 |
| 2,279,615 | Bugatti | Apr. 14, 1942 |
| 2,110,622 | Fischel | Mar. 8, 1938 |
| 1,963,664 | Lambert | June 19, 1934 |